United States Patent Office 3,546,320
Patented Dec. 8, 1970

3,546,320
POLYALKYLENE TEREPHTHALATE MOLDING COMPOSITION
Irl N. Duling, West Chester, Richard S. Stearns, Malvern, and Kenneth A. Scott, Swarthmore, Pa., assignors to Sun Oil Company, Philadelphia, Pa., a corporation of New Jersey
No Drawing. Filed Mar. 25, 1968, Ser. No. 715,573
Int. Cl. C08g 39/10
U.S. Cl. 260—860       11 Claims

ABSTRACT OF THE DISCLOSURE

It is possible to obtain crystalline molded articles from polyalkylene terephthalates by employing a polymer comprising 94 to 60 weight percent of poikalkylene terephthalate and 6 to 40 weight percent of a polyalkylene naphthalene-2,6-dicarboxylate said polymer having at least 5 percent crystallinity. For example, a polymer having 8 percent crystallinity is prepared by blending 80 parts by weight polyethylene terephthalate and 20 parts by weight polyethylene naphthalene-2,6-dicarboxylate for 1 hour at 280° C. The resulting copolymer will contain polymer chains with discrete segments of each of the two blended polymers. The copolymer is then extruded at 260° C., which is above the melting point of the polyethylene terephthalate polymer and segments, but below the melting point of the polyethylene naphthalene-2,6-dicarboxylate polymer and segments thus the crystallinity of the latter polymer and segments is substantially preserved and in addition provides sites for inducing polyethylene terephthalate to crystallize.

BACKGROUND OF THE INVENTION

This invention relates to modification of polyalkylene terephthalate, with a high melting polyester of polyalkylene naphthalene-2,6-dicarboxylate. More specifically the invention relates to a molding material.

A number of methods have been proposed in the prior art for the modification of linear polyesters, such as, polyethylene terephthalate in order to improve or change the properties of the polymer. For example, dyeing properties have been improved by the use of mixtures of acids and/or glycols to produce modified polyesters. Various functional groups having a desired utility have thus been incorporated into the polymers, such as, basic nitrogen, thio-compounds, ethylenic unsaturation, and the like.

Improvements in the molding properties of terephthalate polyesters have been achieved in the prior art by forming a homogeneous mixture of the polyalkylene terephthalate and polycarbonate derived from 4,4'-dihydroxy-di(mononuclear aryl)alkane.

The method of preparing polyalkylene terephthalate from terephthalic acid or dialkyl terephthalate and alkylene glycol was shown by British patent specification No. 578,079. The polyesters are well known for their many excellent properties, such as, high melting point, water resistance, oxidation and heat resistance and solvent resistances. However, the rate of crystallization of polyalkylene terephthalate is too slow for use in injection molding. Upon injection into a mold, the molten polyester supercools to yield a glassy, amorphous article which is brittle. Crystallization can be induced by proper annealing but this is a time consuming process which greatly increases the cycle of time on the injection molder. The result has been the exclusion of polyalkylene terephthalate from the area of molded articles.

The polyalkylene naphthalene-2,6-dicarboxylate polymers are newly developed and as of yet have not gained the wide commercial use of the terephthalate polyesters yet they exhibit, to the extent they have been investigated, most of the properties of the terephthalate polyesters. It has been found that the melting points of the 2,6-polyesters are substantially higher than those of the terephthalate polyesters. The molding properties of the 2,6-polyesters are, however, essentially the same as the terephthalate polyesters and as a result they do not hold any greater promise in this area.

It has now been found that by preparing polyesters containing blocks of both polyalkylene terephthalate and polyalkylene naphthalene-2,6-dicarboxylate molded articles having a substantial degree of crystallinity can be produced. The benefits of mixed polyesters or copolyesters prepared from mixtures of naphthalene-2,6-dicarboxylate and terephthalate are described in U.S. application S.N. 665,240, filed Sept. 5, 1967 of Duling and Johnson, now abandoned.

SUMMARY OF THE INVENTION

Briefly stated the invention relates to a molding polymer composition comprising 94 to 60 weight percent of polyalkylene terephthalate and 6 to 40 weight percent of a polyalkylene naphthalene-2,6-dicarboxylate said molding polymer having at least 5 percent crystallinity.

DESCRIPTION OF THE INVENTION

A moldable composition of polyalkylene terephthalate having 5 to 70 percent crystallinity can be prepared by adding a minor amount of a polyalkylene naphthalene-2,6-dicarboxylate thereto.

As to the suitable polyesters it has been determined that a polyalkylene terephthalate having an inherent viscosity ($\eta_{inh}$) of 0.50 to 0.85 is preferred and for the polyalkylene naphthalene-2,6-dicarboxylate an inherent viscosity ($\eta_{inh}$) of 0.4 to 1.50 is preferred. The inherent viscosity is essentially the same as the intrinsic viscosity ($\eta_{int}$) for these polyester systems at the ranges involved and is used herein as equivalent thereto. The inherent viscosity is indicative of the degree of polymerization and is used herein as a measure thereof.

Inherent viscosity is represented by the equation:

$$\text{inherent} = \ln \frac{\eta \text{ relative}}{C}$$

where $$\eta \text{ relative} = \frac{t}{t_o}$$

$t_o$ = flow time through a viscometer of a liquid reference
$t$ = flow time through the same viscometer of a dilute solution of polymer in the reference liquid
$C$ = concentration of polymer in solution expressed in grams/deciliter Inherent viscosity ($\eta_{inh}$) unless otherwise specified is determined in the instant specification and claims by a 0.5% solution of the polyester in 60/40 phenol-tetrachloroethane. The composition is not merely a blend of the two homopolyesters but results in block copolymer of the two polyesters. For example, if the terephthalate polyesters is represented by

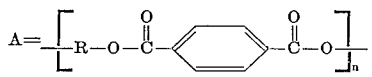

and the naphthalene-2,6-dicarboxylate polyester by

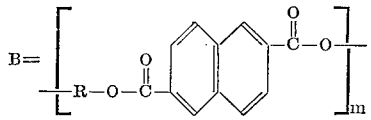

where R is an alkylene radical and $n$ and $m$ are 10 to 200 then a segment of the polyester compositions of the invention could have configurations such as,

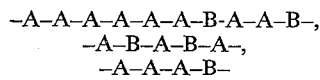

or

B–B–B–B–A

It can be seen that this is a block copolymer composed of the polyester groups of the two contributing polymers. The result of this configuration is that each copolyester chain contains discrete units or blocks of the two types of polyesters. This block copolymer is utilized in molding articles by maintaining a temperature above the melting point of the polyalkylene terephthalate but below the melting point of the polyalkylene naphthalene-2,6-dicarboxylate. Thus the 2,6-polyester segments retain their crystallinity while the terephthalate portion softens and allows the composition to be molded. This is also true for any of the residual homopolyesters present in the composition. Upon cooling, the crystalline 2,6-segments provide the nuclei for crystallization of the terephthalate polyester.

The compositions of the present invention are achieved by blending 6–40, preferably 10–25 weight percent of a polyalkylene naphthalene-2,6-dicarboxylate with a polyalkylene terephthalate. The alkylene portions of the two polyesters need not be the same although it is preferred that they are the same since the compatibility of the polyesters is improved thereby. The compatibility of the homopolyesters is also improved when as little as 5–10 weight percent, based on the total weight of polymer of the block copolyester is present. In this regard not all of the two polyesters present may be converted to the copolyester. It is not essential that they be converted although it is preferable from the standpoint of compatibility that a minimum of at least 5 weight percent of copolyester is produced so that the resulting polyester composition is homogeneous. Moreover, large percentages of the copolyester can be produced when only a small amount of polyalkylene naphthalene - 2,6-dicarboxylate is present since the copolyesters can be produced be adding relatively short segments of one polyester to the other.

The compositions of the present invention are prepared by blending the polyalkylene terephthalate and the polyalkylene naphthalene-2,6-dicarboxylate in a suitable manner such as a Banbury mixer, a rubber mill or the like at a temperature sufficiently high to melt both of the homopolyesters, i.e., at least as high as the melting point of highest melting homopolyester. Depending on the particular alkylene and to a lesser extent on the inherent viscosity of the polyesters, a temperature in the range of 250–320° C. is usually sufficient. During this mixing a transesterification takes place which results in the production of the copolyesters. At a particular temperature the degree of conversion of homopolyester to copolyesters is directly related to the duration of the mixing. It is entirely possible to continue the mixing so long as to result in a complete break down of the homopolyester chains and production of a random copolyester of very short segments which is an amorphous, noncrystalline material. This is to be avoided. The mixing should be continued until the composition is homogeneous but should be terminated before the crystallinity drops to 5 percent, more preferably 15 percent. The point at which heating and mixing should be discontinued as well as the degree of crystallinity at any time in the mixing must be determined routinely for any system of homopolyesters at each temperature. Mixing time usually is in the range of 1 to 120 minutes more usually .1–2.0 hours. The determinations of mixing times are not made here because of the mere mechanical nature thereof and the sheer volume involved. The degree of crystallinity available can be easily determined by removing sample portions at intervals and determining the crystallinity thereof by X-ray diffraction or differential thermal analysis. For the purpose of illustration the chart shows the relationship of degree of crystallizable material at a particular time in the blending of 80 weight percent polyethylene terephthalate and 20 weight percent polyethylene naphthalene-2,6-dicarboxylate at 285° C.

CHART

| Time minutes: | Wt. percent of crystallizable material |
| --- | --- |
| 0 | 70 |
| 5 | 67 |
| 30 | 28 |
| 60 | 8 |
| 120 | 5 |
| 240 | 0 |

The mixing of the homopolymers and the transesterification can be carried out either with or without an added catalyst. Suitable catalysts are the conventional ester-interchange catalysts such as the alkali metals, the alkaline earth metals; the oxides, carbonates, and borates of these two groups of metals; the one to six carbon alkoxides of these two groups of metals; magnesium, zinc, and manganese; the oxides of these metals; zinc borate; the sulfates, phosphates and acetates of zinc, cadmium, magnesium, aluminum and copper; litharge or a combination of litharge with antimony trioxide or pentoxide and triphenyl phosphite as described in U.S. Pat. No. 2,650,213; compounds of the formula

wherein M is an alkali metal, e.g., lithium, sodium or potassium, and R is an alkyl radical containing from 1 to 6 carbon atoms; R can be derived from a lower aliphatic alcohol such as methyl, ethyl, propyl, n-butyl, isobutyl, n-amyl, etc., as described in U.S. Pat. No. 2,720,506; a composition consisting of lithium hydride and a glycol-soluble organic salt of cadmium, magnesium or zinc as described in U.S. Pat. No. 2,681,360.

The naphthalene-2,6-dicarboxylate polyester is prepared in the conventional manner. A naphthalene-2,6-dicarboxylate acid or dialkylester (U.S. Pat. 3,293,223 shows the preparation of the diacid and esters thereof) is reacted with aliphatic α,ω-diols. The mole ratio of diacid or diester to diol is in the range of 1:10 to 1:1, preferably 1:4 to 1:2.

By way of illustration the procedure for the polymerization of the dimethyl esters of naphthalene-2,6-dicarboxylic acid and 1,2-ethanediol is given. The materials are added to a suitable vessel such as stainless steel. A catalyst condensing agent is added to the reaction mass such as the ester-interchange catalysts described above. The reaction mixture is then heated at a temperature in the range of from 150° C. to 225° C., preferably 175° C. to 200° C., at atmospheric pressure in a nitrogen atmosphere for a period of time in the range of from 2 hours to 6 hours. During this time methyl alcohol will be distilled from the reaction mixture. Polymerization is initiated by slowly raising the temperature to between 200° C. and 400° C., preferably 230° C. to 290° C. over a period of time of 0.5 to 2.0 hours. During the continuance of the polymerization at the temperature for an additional 0.5 to 3.0 hours, any unreacted excess 1,2-ethanediol is distilled from the reaction mixture. The pressure is then slowly reduced on the system to below 5 mm. over a period of time of 0.5 to 4.0 hours, followed by continued heating at the elevated temperature and reduced pressure for an additional 2 to 6 hours. In this latter step the last traces of the diol are distilled off and the reaction mixture becomes progressively more viscous.

The specific temperatures and heating periods may vary over wider ranges than those outlined above depending on the observed rate of reaction. In cases where reaction becomes sluggish, higher temperature and/or longer periods of time can be employed. In those cases where the polymer is solidified, or begins to solidify before it is apparent all of the diol has been removed, the temperature and/or the heating period are increased. The conditions can be varied considerably depending upon the degree of the polyesterification desired, the ultimate properties sought, stability of the polyeser being produced and use for which the product is intended. When the desired viscosity is reached under the above-described conditions, evacuation and heating are discontinued, the vessel allowed to cool to approximately room temperature, and the polyester removed.

In theory a total of only one mole of the diol is necessary to effect complete polyesterification with one mole of the diester. However, in practice, it is difficult to attain complete reaction under these conditions. It is therefore usually necessary to utilize an excess of the diol, preferably at least two moles of diol to one mole of the diester. Quantities substantially larger than about 2 moles of the diol can be used; however, since they are not necessary, in the interests of economy, they are not recommended.

From about 0.005 percent to about 0.2 percent of such catalysts based on the weight of the naphthalene dicarboxylic acid or ester being condensed can be employed. Higher or lower percentages can also be employed. Generally, from about 0.01 percent to about 0.05 percent of the catalytic condensing agent can be advantageously employed, based on the weight of diacid or diester. As will be apparent to those skilled in the art, it is generally advantageous from a cost standpoint to utilize the minimum quantity of one of the above catalysts which effects optimum results. Obviously, however, quantities larger or smaller than those outlined above will be employed by those skilled in the art where needed, e.g., to accelerate or to decelerate rate of reaction, to modify properties such as luster, molecular weight, tenacity, etc.

The reaction can be carried out in the presence or absence of a solvent, preferably the latter. Illustrative of such solvents are inert high boiling compounds, such as diphenyl ether, diphenyl, mixed tolyl sulfones, chlorinated naphthalene, chlorinated diphenyl, dimethyl sulfolane, etc. It is essential to exclude oxygen at all stages of the condensation reaction. Otherwise discoloration, low molecular weight, and/or insolubilization of the polyester results. Inert atmospheres which can advantageously be employed include nitrogen, hydrogen, helium, etc.

Suitable diols for preparing both the polyalkylene terephthalate and the polyalkylene naphthalene-2,6-dicarboxylate are aliphatic, preferably having 2 to 12 carbon atoms and include for example, ethylene glycol; trimethylene glycol; 1,4-butanediol; 1,4-pentanediol; 1,6-hexanediol; 1,7-heptanediol; 1,8-octanediol; 2,2-diethyl-1,3-propanediol, diethylene glycol; triethylene glycol; tetraethylene glycol; dipropylene glycol; cyclohexanediol; and the like.

The following examples are presented to illustrate the invention.

Example 1.—Preparation of polyethylene terephthalate

To dimethyl terephthalate, and ethylene glycol in an amount 2.2 mol times the dimethyl terephthalate was added 0.005 percent of zinc acetate based on the polyester formed, following which the ester-interchange reaction was carried out for 2 hours at 180–190° C. and at normal pressure. This was followed by effecting the condensation polymerization reaction for 4 hours in a cylindrical vessel of stainless steel, the bath temperature being 280° C. and the pressure, 0.5 mm. Hg whereby polyethylene terephthalate was obtained. This polyester is about 40 percent crystalline and a melting point of 252° C.

Example 2.—Preparation of polyethylene naphthalene-2,6-dicarboxylate

To 30 grams of the dimethyl ester of naphthalene-2,6-dicarboxylate was added 30 cc. of redistilled 1,2-ethanediol. To this mixture there was added 0.006 gram of zinc oxide and 0.0105 gram of antimony pentoxide. The mixture was heated in an atmosphere of nitrogen at a temperature of 190–195° C. for 4.75 hours. During this time methyl alcohol was distilled from the mixture. The temperature was increased to 230° C. over a 2 hour period. During this time unreacted 1,2-ethanediol was distilled off. To insure as complete a removal of unreacted diol as possible, the pressure on the system was reduced over a 0.5 hour period to about 1 mm. of Hg. These conditions were maintained for 2 hours. The mixture was cooled and there was recovered about 30 grams of the polyester. This material is about 32 percent crystalline and a melting point of 265°C.

Example 3.—Preparation of the polyethylene terephalate-polyethylene naphthalene-2,6-dicarboxylate copolyester Eighty parts by weight of the polyethylene terephthalate of Example 1 and 20 parts by weight of the polyethylene naphthalene-2,6-dicarboxylate of Example 2 are blended together in a Banbury mixer at 280° C. for 1.0 hour. X-ray diffraction indicates the presence of about 30 weight percent of the copolyester. This material is cooled and pelletized. The pellets are placed in a heater and heated to 260° C. and extruded into bars 2 x 2½ under 5,000 p.s.i.g. The extruded material is found to have 8 percent crystallinity.

Examples 4 and 5

A portion of each of the polyesters of Examples 1 and 2 is extruded under the conditions indicated in Example 3 to yield molded bars exhibiting essentially no crystallinity. The results of the various polyesters are shown in the table below.

| | Temp., °C. | Pressure, p.s.i.g. | Crystallinity |
|---|---|---|---|
| Polyester example: | | | |
| 1 | 250 | 5,000 | Amorphous. |
| 2 | 300 | 5,000 | Do. |
| 3 | 280 | 5,000 | 8% crystalline. |

The invention claimed is:

1. A polymer blend composition comprising 94 to 60 weight percent of a polyalkylene terephthalate, 6 to 40 weight percent of a polyalkylene naphthalene-2,6-dicarboxylate wherein there is at least 5 weight percent of a block copolymer comprising discrete polymer segments of the polyalkylene terephthalate and the polyalkylene naphthalene-2,6-dicarboxylate said polymer blend composition having at least 5 percent crystallinity.

2. A polymer blend composition according to claim 1 wherein the inherent viscosity of the polyalkylene terephthalate is in the range of 0.50 to 0.85 and inherent viscosity of the polyalkylene naphthalene-2,6-dicarboxylate is in the range of 0.4 to 1.5.

3. A polymer blend composition according to claim 1 comprising 90 to 75 weight percent of the polyalkylene terephthalate and 10 to 25 weight percent of the polyalkylene naphthalene-2,6-dicarboxylate.

4. A polymer blend composition according to claim 1 wherein the alkylene portions of the polyalkylene terephthalate and the polyalkylene naphthalene-2,6-dicarboxylate are derived from aliphatic diols having 2 to 12 carbon atoms.

5. A polymer blend composition according to claim 4 wherein the polyalkylene terephthalate is polyethylene terephthalate.

6. A polymer blend composition according to claim 5 wherein the polyalkylene naphthalene-2,6-dicarboxylate is polyethylene naphthalene-2,6-dicarboxylate.

7. A process of molding articles having at least 5 percent crystallinity from a polymer blend composition according to claim 1 comprising maintaining said polymer blend composition at a temperature above the melting point of the polyalkylene terephthalate but below the melting point of the polyalkylene naphthalene-2,6-dicarboxylate, molding the articles and cooling the molded polymer composition.

8. A process of molding articles according to claim 7 wherein the polyalkylene terephthalate is polyethylene terephthalate and the polyalkylene naphthalene-2,6-dicarboxylate is polyethylene naphthalene-2,6-dicarboxylate.

9. The process of preparing a polymer blend composition according to claim 1 comprising mixing polyalkylene terephthalate and polyalkylene naphthalene-2,6-dicarboxylate at a temperature at least as high as the melting point of the highest melting polyester until the composition is homogenous but no longer than the time at which there is less than 5 percent of crystallizable material in the composition.

10. The process according to claim 9 wherein the temperature is in the range of 250–320° C. for a period of time in the range of .1 to 2.0 hours.

11. A polymer blend composition consisting essentially of 94 to 60 weight percent of a polyalkylene terephthalate, 6 to 40 weight percent of a polyalkylene naphthalene-2,6-dicarboxylate wherein there is at least 5 weight percent of a block copolymer comprising discrete polymer segments of the polyalkylene terephthalate and the polyalkylene naphthalene-2,6-dicarboxylate said polymer blend composition having at least 5 percent crystallinity.

References Cited

UNITED STATES PATENTS

| | | | |
|---|---|---|---|
| 3,265,762 | 8/1966 | Quisenberry | 260—860 |
| 3,361,848 | 1/1968 | Siggel et al. | 260—873 |
| 3,446,778 | 5/1969 | Waller et al. | 260—860 |
| 3,466,348 | 9/1969 | Wiener | 260—860 |

FOREIGN PATENTS

| | | | |
|---|---|---|---|
| 951,818 | 3/1964 | Great Britain | 260—860 |
| 109,642 | 1/1964 | Czechoslovakia | 260—75 |

OTHER REFERENCES

Vesely et al.: Plaste Kautschuk 10, 146–8 (1963).
Chem. Abst., vol. 59: 2960f; 1963, Vesely et al. Glycol".

WILLIAM H. SHORT, Primary Examiner

E. WOODBERRY, Assistant Examinar